(12) United States Patent
Anderson

(10) Patent No.: US 7,284,052 B1
(45) Date of Patent: Oct. 16, 2007

(54) ESTIMATING UTILIZATION OF COMPUTING SYSTEM RESOURCES

(75) Inventor: Eric Anderson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 839 days.

(21) Appl. No.: 10/210,939

(22) Filed: Aug. 2, 2002

(51) Int. Cl.
*G06F 15/173* (2006.01)
*G06F 11/30* (2006.01)

(52) U.S. Cl. .................. 709/226; 702/186; 709/224
(58) Field of Classification Search ......... 709/223–224
See application file for complete search history.

(56) References Cited

U.S. PATENT DOCUMENTS

| | | | | |
|---|---|---|---|---|
| 5,088,058 A | * | 2/1992 | Salsburg | 703/25 |
| 5,167,033 A | * | 11/1992 | Bryant et al. | 709/235 |
| 5,245,638 A | * | 9/1993 | Gustafson | 714/47 |
| 5,303,166 A | * | 4/1994 | Amalfitano et al. | 702/186 |
| 5,615,357 A | * | 3/1997 | Ball | 703/21 |
| 5,742,819 A | * | 4/1998 | Caccavale | 707/200 |
| 5,812,780 A | * | 9/1998 | Chen et al. | 709/224 |
| 6,339,750 B1 | * | 1/2002 | Hoyer et al. | 702/182 |
| 6,434,513 B1 | * | 8/2002 | Sherman et al. | 702/186 |
| 6,542,854 B2 | * | 4/2003 | Yang et al. | 702/186 |
| 6,810,361 B1 | * | 10/2004 | Anderson | 702/186 |
| 6,925,431 B1 | * | 8/2005 | Papaefstathiou | 703/17 |
| 2003/0151619 A1 | * | 8/2003 | McBride | 345/736 |

OTHER PUBLICATIONS

Anderson, Eric, "Simple Table-based Modeling of Storage Devices." Storage and Content Distribution Department, Hewlett-Packard Laboratories, Jul. 14, 2001.
Griffin, J.L., Schlosser, S.W., Ganger, G.R. and Nagle, D.F. "Operating System Management of MEMS-based Storage Devices." Proceedings 4th Symposium on Operating Systems Design & Implementation, San Diego, Ca, Oct. 23-25, 2000.
Worthington, B.L., Ganger, G.R. and Patt, Y.N. "Scheduling for Modern Disk Drives and Non-Random Workloads," Department of Electrical Engineering and Computer Science, University of Michigan, Mar. 1, 1994.

* cited by examiner

*Primary Examiner*—Bunjob Jaroenchonwanit
*Assistant Examiner*—Julian Chang

(57) ABSTRACT

A technique for determining utilization of a computing system resource. A trace of requests in a computing system is collected. The trace is run while a time-basis of the requests of the trace is altered by issuing each request at a time that is based on timing of one or more prior requests. A first time-based statistic associated with collecting the trace is compared to a second time-based statistic associated with running the trace to determine the utilization.

33 Claims, 5 Drawing Sheets

ESTIMATING UTILIZATION OF COMPUTING SYSTEM RESOURCES

FIELD OF THE INVENTION

The present invention relates to characterizing computing systems. More particularly, the present invention relates to the field of estimating utilization of a computing system and components thereof.

BACKGROUND OF THE INVENTION

Utilization is a measure of how well a computing system resource, such as a processor, memory device, storage system or communication infrastructure, is used. Measures of utilization are generally indicative of how much capacity of a resource is consumed by its workload and how much capacity is unused.

Knowledge of the level of resource utilization in computing systems is important for ensuring that applications are adequately serviced and that computing resources are deployed where they are most needed. If a resource is over-utilized, the system configuration may not support additional demands, such as additional users or an increased workload. As a result, users may experience performance degradation. To remedy this situation, the workload may be spread over additional or higher-capacity resources. Conversely, if only a small portion of a resource is being utilized, its unused capabilities may be wasted. To correct this, a lower-capacity resource may be substituted or a portion of the workload may be reassigned to the under-utilized resource.

One technique for estimating the utilization of a computing system resource involves the use of models. However, model construction can be time-consuming and there is no guarantee that utilization under any particular workload will be accurately predicted by the model. Other techniques involve monitoring activity of the resource under a workload. While this approach indicates the current workload of the resource, it has limited ability to predict how much capacity of the resource is unused. In addition, the required instrumentation can be difficult to implement.

Therefore, there is a need for improved techniques for estimating utilization of a computing system resource.

SUMMARY OF THE INVENTION

The present invention is a technique for determining utilization of a computing system resource. A trace of requests in a computing system is collected and stored. The trace includes at least a start time for each request represented in the trace. The trace is run by issuing and executing the requests of the trace while a time-basis of the requests of the trace is altered by issuing each request at a time that is based on timing of one or more prior requests. A first time-based statistic associated with collecting the trace is compared to a second time-based statistic associated with running the trace to determine the utilization.

Other aspects and advantages of the present invention will become apparent from the following detailed description, taken in conjunction with the accompanying drawings, illustrating by way of example the principles of the present invention.

DETAILED DESCRIPTION OF A PREFERRED EMBODIMENT

The invention is a technique for estimating utilization of a computing system and for estimating the utilization of components thereof. By obtaining an estimate of utilization, the computing system may be modified to improve the utilization. Thus, the present invention may be used to better ensure that the system is sufficiently provisioned for a workload without being over-provisioned. The invention may be used in connection with design of a new system, or for replacement, modification, or analysis of an existing system.

In one aspect, the computing system includes a data storage resource for which utilization is estimated. While the figures and discussion herein are directed primarily to aspects of the invention in which utilization is estimated for a data storage system and components thereof, it will be understood that utilization of any type of computing system or resource thereof may be estimated in accordance with aspects of the present invention.

Figure 1:
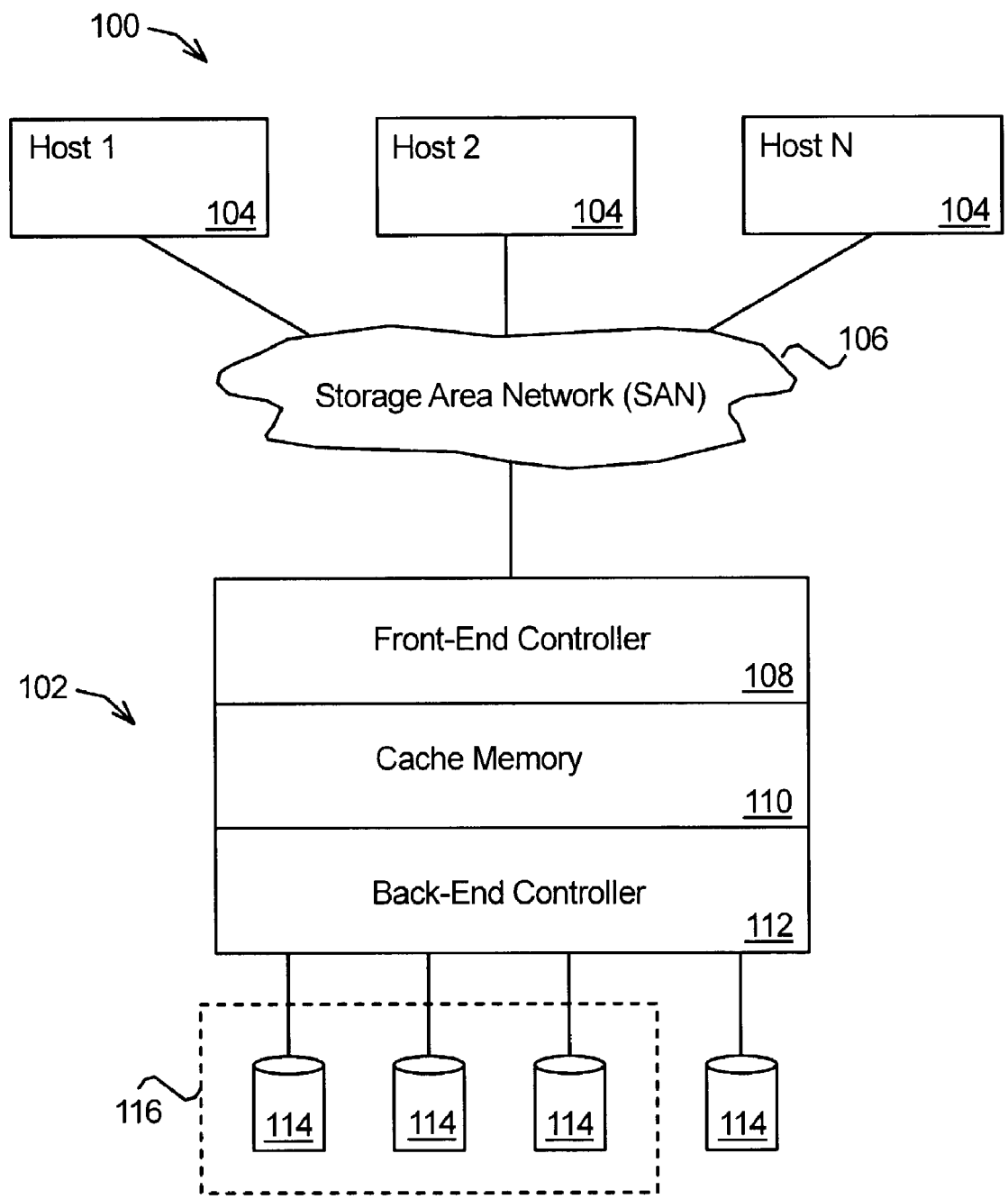
FIG. 1 illustrates a block diagram of a computer system for which utilization may be estimated in accordance with an aspect of the present invention.

FIG. 1 illustrates an exemplary computing system 100 including a data storage resource 102 and one or more networked computing resources 104. The computing resources 104 may each be implemented as a general-purpose computer system, workstation, terminal or other machine that hosts application programs. The computing resources 104 may communicate with the data storage system 102 via a network resource 106 (e.g., a storage area network or SAN). The computing resources 104 function as clients of the data storage system 102. However, any of the resources 104 may function as a server, in which case, such a computing resource 104 may have its own clients.

The data storage system 102 may include a plurality of storage devices 114. For example, the data storage system 102 may include any number and types of drives, such as hard drives (also referred to as disk drives), optical drives, and tape drives. In addition, a front-end controller 108 may be included to provide an interface between the network 106 and a cache memory 110. The cache memory 110 may store frequently or recently accessed data. A back-end controller 112 may be included to provide an interface to the storage devices 114. The storage devices 114 may be arranged in accordance with one or more RAID sets 116. In this case, a single logical volume may be stored across the devices included in the set 116.

Each computing resource 104 may include an operating system and one or more application programs. Exemplary applications include, but are not limited to, word-processing programs, database programs, e-mail programs, and backup programs. Certain application data may be stored at the resources 104, and other application data (e.g., databases or backup files) might be stored on or across multiple of the data storage devices 114 in the data storage system 102 or even across multiple data storage systems.

Users of the computing system 100 communicate through the computing resources 104. When a resource 104 performs an operation, it may send a request to the data storage system 102 to store information in the data storage system 102 or to retrieve information previously stored in the data storage system 102. In response to a request to store information, the data storage system 102 receives the information and a location within the data storage system 102 to store the information (e.g., a Logical Unit Number and a SCSI block address) or a name for a location (e.g., a filename or file handle plus offset) from the computing resource 104 making the request and then stores the information. In response to a request to retrieve information, the data storage system 102 receives the location, or the name for the location, of the requested information in the data storage system 102 from the computing resource 104. The data storage system 102 then retrieves the requested information and returns it to the computing resource 104 making the request.

More than one computing resource 104 may be executing an application at a given time, and, more than one computing resource 104 may be accessing or storing application data in the data storage system 102 at a given time.

Figure 2:
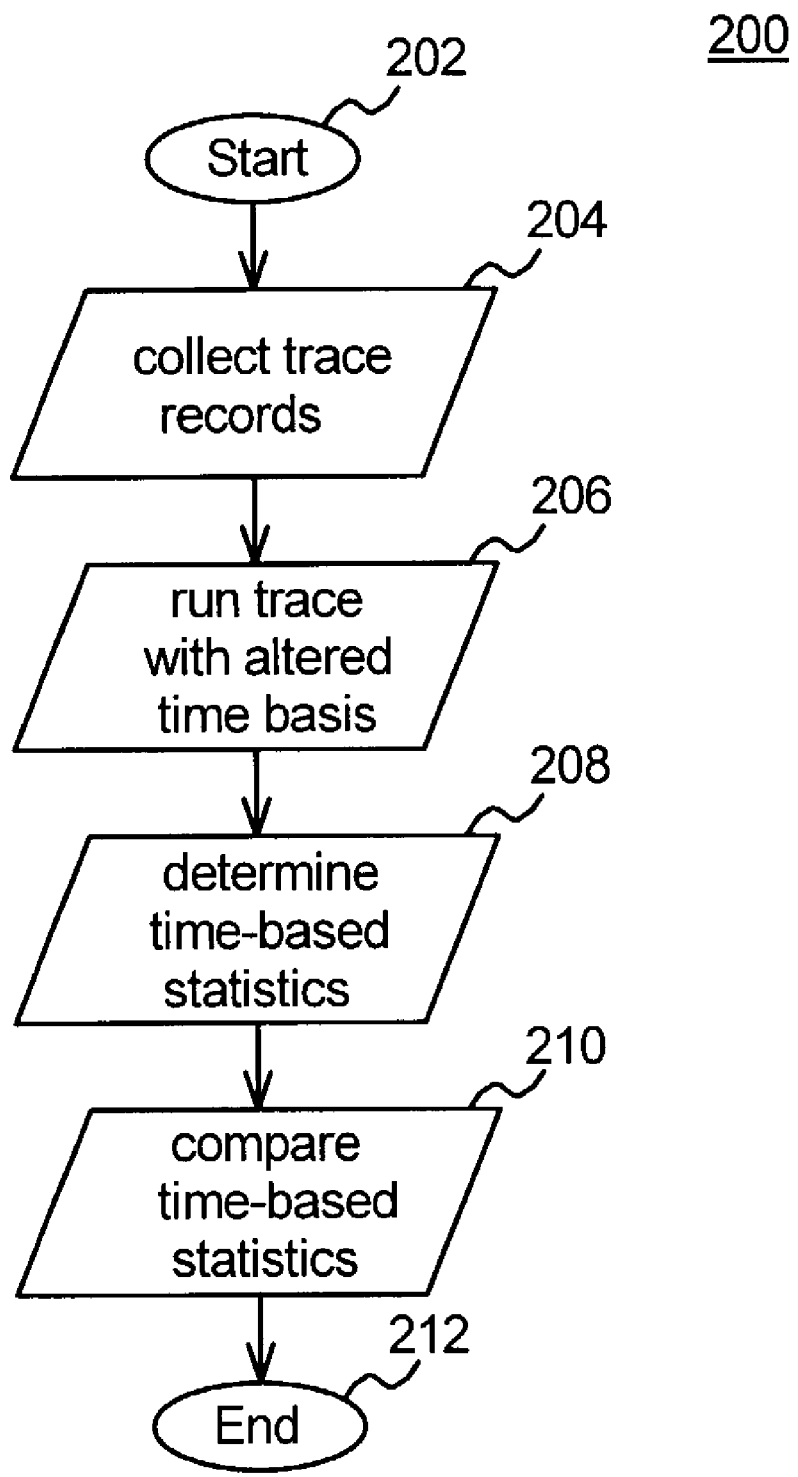
FIG. 2 illustrates a flow diagram of a method for estimating utilization of a computing system resource in accordance with an aspect of the present invention.

FIG. 2 illustrates a flow diagram of a method 200 for estimating utilization of a computing system resource in accordance with an aspect of the present invention. Program flow begins in a start state 202 and moves to a state 204 in which trace records are collected. For this purpose, activity (e.g., I/O activity, communication activity, CPU processing activity and so forth) in the system 100 may be monitored and recorded by one or more trace facilities. Each computing resource 104 may run an operating system (e.g., UNIX or WINDOWS NT) which controls a flow of data between the computing resources 104 and the data storage system 102 and collects traces. Other operating systems are also able to generate system traces or equivalents thereof. Rather than using an operating system to collect trace records, trace records may be generated by a hardware and/or software facility that intercepts communication activity.

A "trace" is a collection of activity records, such as network packets, disk I/O requests or file system requests. A trace facility instructs each computing resource 104 to gather the traces. Therefore, one or more computing resources 104 might be gathering traces at a given time. Traces may also be gathered by infrastructure of the network 106 (e.g., by one or more switches or routers) or by the data storage system 102 itself (e.g., by one or more disk arrays). The traces may be stored at the computing resources 104, in the data storage system 102, or in some other manner.

Each activity record includes a start time and a finish time. For a storage system, the start time may indicate the time when the request is sent to a storage resource, while the finish time may indicate the time when the requested data is returned (for a read request) or stored (for a write request). Each activity record may include additional information such as a create time (when an application issues the request to a kernel), an indication of the type of request (e.g, read or write), a start address (in the case of storage requests), a size and one or more identifiers, such as an identification of a device that originated the request, an identification of a device intended to act on the request, and/or a process identification.

As mentioned, trace records may be collected for a storage resource. For example, where utilization is to be determined for the storage system 102 as a whole, all of the trace records for activity in the storage system 102 may be collected. Alternatively, where utilization is to be determined for a portion of the storage system 102, such as for a single storage device 114, trace records may be collected only for activity directed to that device 114.

Trace records may be collected for other types of resources. For example, traces may be collected that relate to activity of the central processing unit(s) of one or more of the computing resources 104 or that relate to network communication activity in the network 106 or in a network connecting computing resources 104 to other clients (not shown). For example, records of all communication in the network 106 may be collected. Alternatively, only records of communication activity that utilizes a selected portion of the network 106, such as a single hub or link, may be collected.

Figure 3A:
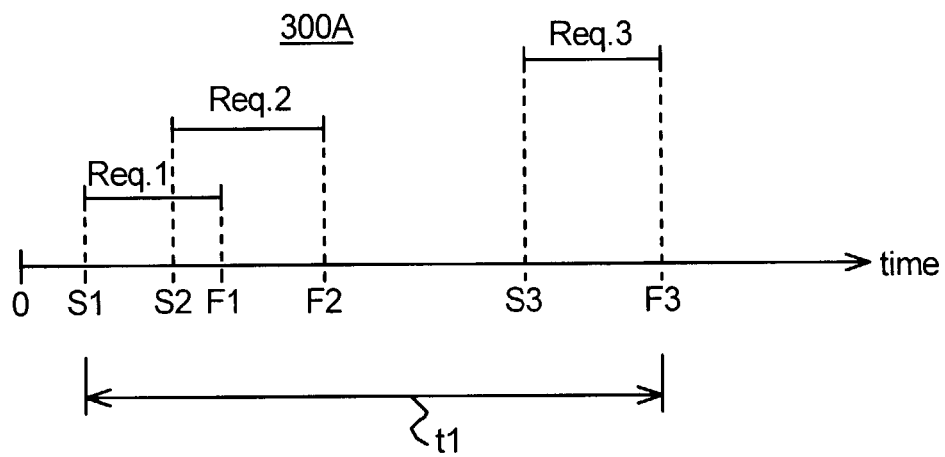
FIG. 3A illustrates an exemplary trace, including three request records in accordance with an aspect of the present invention.

FIG. 3A illustrates an exemplary trace 300A, including three request records shown with respect to time. Each of the three request records, labeled Req.1, Req.2 and Req.3, has a start time, a finish time and a length. The length for a request is a difference between the finish time and the start time for the request. A first request, labeled Req.1, has a start time S1 and a finish time F1. A second request, labeled Req.2 has a start time S2 and a finish time F2. A last request, labeled Req.3, has a start time S3 and a finish time F3. It will be apparent that a particular trace may include a different number of records (e.g., tens, hundreds, thousands or more) having various start times, finish times and lengths.

Program flow then moves from the step 204 to a step 206, in which the trace is run using an altered time basis. The time basis may be altered by reducing the time elapsed between requests such that the trace is time-compressed. Alternately, the trace may be time-expanded such that time elapsed between requests is expanded while running the trace. Thus, when originally collected, the trace reflects the actual workload on the system. However, when time-altered, the requests are run as an artificial workload.

One aspect of altering the time basis for the trace involves determining an average queue length for the original trace. The queue length generally indicates the number of requests started, but not yet finished, at any given time. This statistic may be a time-averaged or request-averaged. In the case of a time-averaged queue length, the sum of pending request times is computed and then divided by the length of the trace.

$$\text{Queue Length(time-averaged)} = \frac{\sum (F_i - S_i)}{t} \quad (1)$$

Using equation (1), the time-averaged queue length for the trace of FIG. 3 having three requests, Req.1, Req.2, and Req.3, and a length t1, may be computed as:

$$\text{Queue Length(time-averaged)} = \frac{(F3 - S2) + (F2 - S2) + (F1 - S1)}{t1} \quad (2)$$

For a request-averaged queue length, the queue-length statistic is computed as a sum of requests pending at each start time, divided by the total number of requests n. Thus, the average-queue length may be given as:

$$\text{Queue Length(request-averaged)} = \frac{\sum \text{No. Pending[start\_time]}}{n} \quad (3)$$

For the trace of FIG. 3, the request-averaged queue length may be computed as:

$$\text{Queue Length(request-averaged)} = \frac{1+2+1}{3} = \frac{4}{3} \quad (4)$$

At start time S1, only Req.1 is outstanding. At start time S2, Req.1 and Req.2 are outstanding, while at start time S3, only Req.3 is outstanding. Thus, the numerator in equation (4) is four. There are a total of three requests in the trace 300A. Accordingly, the divisor in equation (4) is three.

Alternately, the queue length statistic may be computed as a sum of requests pending at each finish time, divided by the total number of requests.

Then, when the trace is run, the requests are issued so as to maintain the average queue-length statistic (e.g., time averaged queue length, request-averaged queue length or other average queue length statistic) over the entire trace and to minimize or eliminate time between requests. Thus, the requests are issued as quickly as they can be processed, while maintaining the average number outstanding according to the average queue length statistic. The average number of outstanding requests may be maintained over the entire trace as an exponentially-weighted moving average, a simple mean, or other statistic.

Figure 3B:
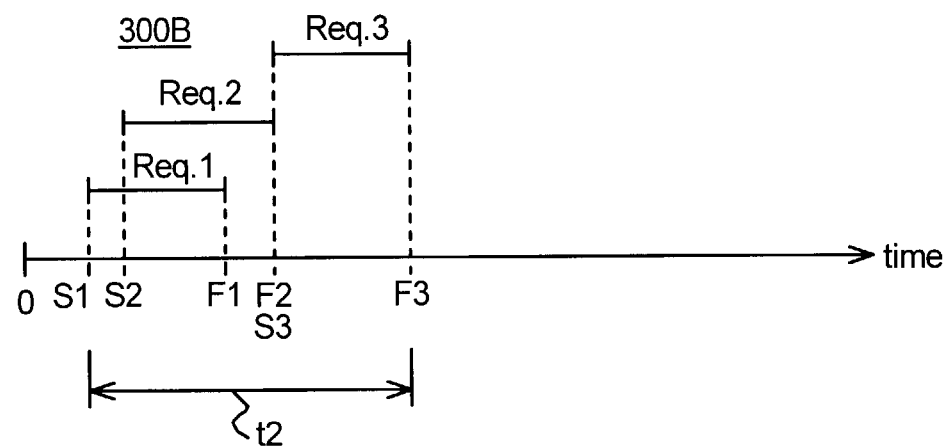
FIG. 3B illustrates the trace of FIG. 3A, after having been time-compressed in accordance with an aspect of the present invention.

FIG. 3B illustrates running the trace of FIG. 3A so as to maintain the request-averaged queue length and to minimize or eliminate time between requests. As shown in FIG. 3B, there is no time elapsed between requests. Assuming all of the requests were issued one after the other with no time between requests, this would result in a constant queue length of one. To increase the average queue length to 4/3, at least one of every three requests needs to be issued while another request is pending. Accordingly, the trace 300B of FIG. 3B shows that Req.2 is issued while Req.1 is still pending.

The two above-described techniques maintain the average queue length over the entire trace. Thus, if the workload is bursty (e.g., having periods of relatively high activity separated by periods of relatively low activity), altering the time basis for running the trace (step 206) will tend to eliminate this burstiness characteristic by issuing requests at a more uniform rate.

Figure 4:
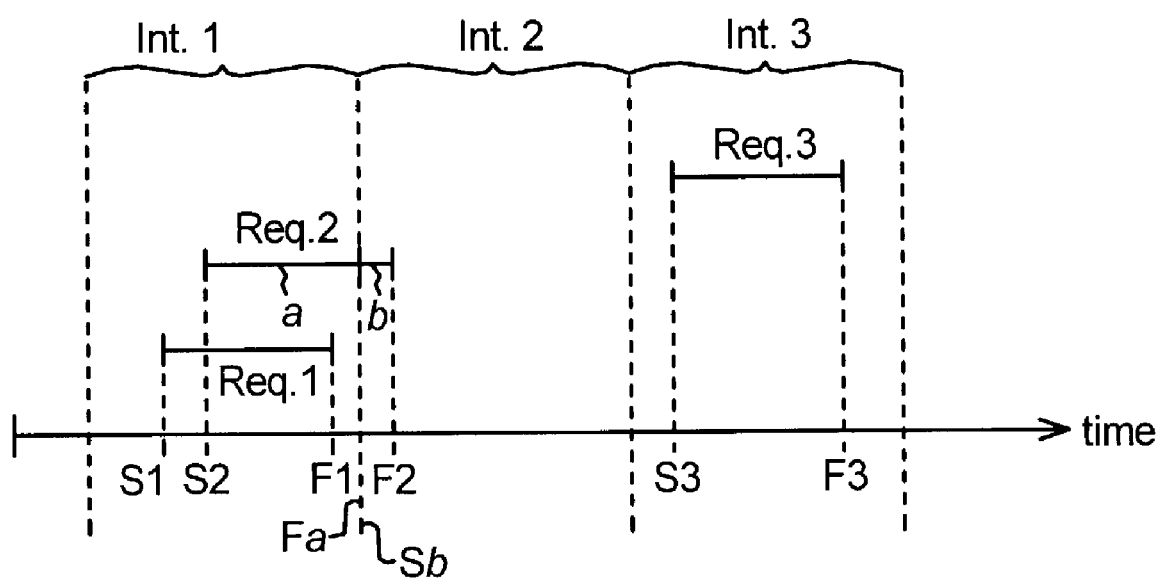
FIG. 4 illustrates a trace divided into multiple discrete intervals in accordance with an aspect of the present invention.

Thus, in another aspect, the trace is divided into multiple discrete intervals and an average queue length is determined for each of the multiple discrete intervals. FIG. 4 illustrates a trace that has been divided into discrete intervals, Int.1, Int.2, Int.3. For each interval, an average queue length is determined. While FIG. 4 shows only one or two requests per interval, it will be understood that many more requests may occur in each. The average queue length for each interval may be computed as a time-averaged statistic (e.g., using equation (1)) or as a request-averaged statistic (e.g., using equation (3)). The intervals may be of uniform or variable duration and may be approximately one, two or more orders of magnitude smaller than the total length of the trace. As an example, for a trace that has a length of one day, the intervals may be selected to have a length of one second. As another example, intervals of one minute may be selected for such a trace.

Thus, a series of average queue length values are formed including one value corresponding to each time interval. When the time-altered trace is run (step 206), the corresponding average queue length is maintained for each interval. As a result, the time-altered trace is expected to better reflect the burstiness of the original trace. The intervals may be compressed, for example, by starting operations of a next interval as soon as all of the operations from a current interval are completed. Alternately, a next interval may be started prior to the end of the current interval. For example, the next interval may be started as soon as all of the operations, save a specified number of the operations, from the current interval are completed. The specified number may be one, two or more and is preferably selected to be close to the average queue length of the current or next interval so as to avoid having the queue length fall to an uncharacteristically low level during replay.

Certain requests may be pending at the divisions between intervals. This is shown in FIG. 4 where the request Req.2 starts during interval Int.1, but is not completed until sometime during the interval Int.2. When this occurs, the request is preferably treated as two requests of shorter duration, where each of the shorter requests occurs entirely within an interval, for computing the average queue lengths for each interval. Thus, as shown in FIG. 4, the request Req.2 may be divided in two portions, labeled a and b. A first portion a has a start time S and a finish time Fa. Because the finish time Fa coincides with the boundary between the intervals, the portion a is entirely within the interval Int.1. Thus, the average queue length for the interval Int.1 may be computed assuming it includes a request having a start time of S and a finish time of Fa. Similarly, a second portion b has a start time Sb and a finish time of F. Because the start time Sb coincides with the boundary between the intervals, the portion b is entirely within the interval Int.2. Thus, the average queue length for the interval Int.2 may be computed assuming it includes a request having a start time of Sb and a finish time of F.

Alternately, the request may be treated as occurring entirely in either interval for purposes of computing the average queue length for the intervals.

In another aspect, the trace may be time-altered by forming a series of values, each of which indicates a number of requests outstanding. One value is formed at each start time of a request to indicate the number of requests outstanding at that start time. Thus, for the trace 300A of FIG. 3A, the series of values is 1, 2, 1, for each of the start times, S1, S2 and S3, respectively. Note that this series corresponds to the values summed in the numerator of equation (3) for determining the request-averaged queue length. Then, when the trace is run (step 206), the requests are issued in accordance with the series of values, without idle periods between issuing requests.

By following the series, 1, 2, 1, the resulting trace is similar to that of FIG. 3B. More particularly, the first request Req.1 is issued, this corresponds the first value in the series. Immediately thereafter, the next request Req.2 may be issued since the second value in the series (i.e. 2) indicates that two requests are pending. Then, both Req.1 and Req.2 are completed before Req.3 is issued, since the third value in the series (i.e. 1) indicates that one request is pending.

Figure 5:
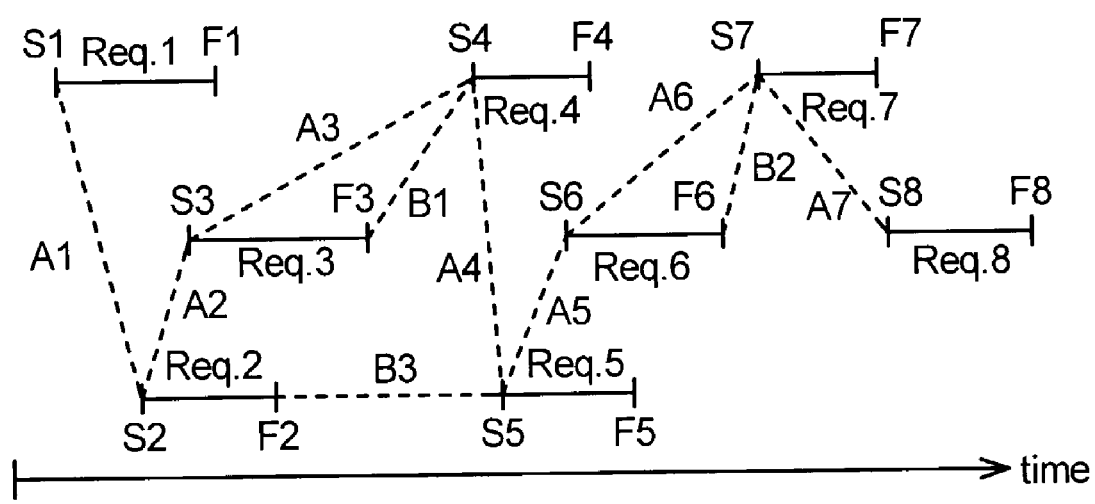
FIG. 5 illustrates a trace in which trace intervals of first and second types are identified in accordance with an aspect of the present invention.

In another aspect of the invention, intervals between requests may be identified as being of different types of intervals and, then, the intervals may be selectively collapsed according to their type. For example, FIG. 5 illustrates a trace 500, including requests, Req.1 through Req.8. A first type of interval has a beginning that coincides with a start time of a first request for the interval and an ending that coincides with a start time of a second request for the interval wherein the start time of the second request occurs later than the start time of the first request. Thus, an interval A1 has a beginning that coincides with the start time S1 of the request Req.1 and an ending that coincides with the start time S2 of the request Req.2. Similarly, an interval A2 has a beginning that coincides with the start time S2 of the request Req.2 and an ending that coincides with the start time S3 of the request Req.3. This sequence may continue in this manner for each interval between successive request start times such that an interval A7 has a beginning that coincides with the start time S7 of the request Req.7 and ending that coincides with the start time for the request Req.8.

In addition, a second type of interval may be identified within the trace. Each interval of the second type has a beginning that coincides with a finish time of a first request for the interval and an ending that coincides with a start time of a second request for the interval. The start time of the second request occurs later than the start time of the first request. Thus, an interval B1 has a beginning that coincides with the end time F3 of the request Req.3 and an ending that coincides with the start time S4 of the request Req.4. Similarly, an interval B2 has a beginning that coincides with the end time F6 of the request Req.6 and an ending that coincides with the start time of the request S7.

As shown in FIG. 5, intervals of the first and second type are identified only for selected requests of the trace. For example, in FIG. 5, each interval of the first type is identified for pairs of requests that have start times that occur closest in time. For example, the next start time after S1 is S2. Thus, the interval A1 extends between these adjacent start times. However, the intervals may alternately be defined as extending between start times that are separated by one or more intervening start times. For example, an interval may be identified as extending between the start times S1 and S3, with one intervening start time (i.e. start time S2).

As shown in FIG. 5, intervals B1 and B2 of the second type are identified only for idle times between requests. Thus, as shown in FIG. 5, no requests are pending during the intervals B1 and B2. It will be apparent, however, that this need not be the case. For example, intervals of the second type may be identified as a having beginnings that coincide with the end time of each nth request and endings that coincide with a next-closest start time, or a start time that is one or more start times away (i.e. there are one or more start times that occur during each interval of the second type). Thus, interval B3 of the second type has a beginning that coincides with the end time F2 of Req.2 and an ending that coincides with the start time S5 of Req.5. Note that portions of both request Req.3 and request Req.4 are pending during the interval B3 since the interval B3 begins before the finish time F3 of Req.3 and ends after the start time S4 of Req.4. Similarly, another interval of the second type may be defined as having a beginning that coincides with the end time F4 of request Req.4 and an ending that coincides with the start time S8 of request Req.8. Thus, portions of the requests Req.5, Req.6 and request Req.7 are pending during such an interval since it begins before the finish times F5 and F6 of Req.5 and Req.6 and ends after the start time S7 of Req.7.

Then, once the intervals of the first and second types have been identified, altering the time-basis of the requests (step 206) may include reducing (or expanding) the intervals based on type. For example, the intervals of the first type may be reduced to substantially zero while the intervals of the second type are substantially maintained. As another example, the intervals of the second type may be reduced to substantially zero while the intervals of the first type may be substantially maintained. As still another example, altering the time-basis of the requests of the trace may be accomplished by reducing (or expanding) the intervals of the first type by a predetermined proportion while substantially maintaining the intervals of the second type. As another example, intervals of the second type may be reduced (or expanded) by a predetermined proportion while the intervals of the first type may be substantially maintained.

Further, prior to identifying the intervals of the first and second types, the requests of the trace may be grouped according to selected processes of the computing system or according to one or more selected computing resources 104 of the computing system. A selected process may, for example, include only requests generated by a particular application program running on one of the computing resources (FIG. 1). For a trace, multiple different groups may be identified. Then, intervals of the first and second types may be identified only among requests of the same group. Thus, when the entire trace is run, the time basis for requests of each process is altered based only on the timing of the requests of that same group. This technique of grouping requests may also be in conjunction with the average queue length techniques described herein.

It will be apparent that for the techniques described herein for running a trace while altering its time basis, requests are issued at a time that is based on timing of one or more prior requests in the trace. Thus, much of the original character of the trace is retained though its time basis is altered. It will also be apparent that any means of determining a queue-length statistic from the original trace (e.g., computing a time-averaged or request averaged queue length, forming series of values, or using another statistical means) may be combined with any means of maintaining an appropriate number of outstanding requests while the trace replayed (e.g., by using a exponentially-weighted moving average or a simple mean, or by following the series of values or by using another statistical means).

Returning to the flow diagram of FIG. 2, program flow then moves from the step 206 to a step 208. In the step 208, time-based statistics for collecting the trace (step 204) and for replaying the trace (step 206) are determined.

Assume that capacity of the computing system resource is unused during the period in which the trace was collected (step 204). Then, when the trace is run (step 206), at least some of this additional capacity is expected to be used to process the requests since they arrive at a faster rate. By using this additional capacity to process the same requests, it is expected that the total time required to run the trace will be shorter than the time during which the trace was collected. Conversely, assume that all or nearly all of the capacity of the computing system resource is used during the period in which the trace was collected (step 204). Then, when the trace is run, it is unlikely that the requests will processed any faster than previously since there is little or no additional capacity to process them. Rather, they will generally be queued or the rate at which they are issued will be slowed until they can be processed. Under these circumstances, it is expected that the total time required to run the trace will not be substantially different than previously.

Thus, where the time basis of the trace is compressed (in step 206), this second period of time is generally expected to be shorter than the time determined for collecting the trace (in step 204), by an amount that is related to the utilization. Conversely, where the time basis of the trace is expanded (in step 206), this second period of time is generally expected to be longer than the time determined for collecting the trace (in step 204).

The length of a trace may be computed as a difference between the start time of the earliest record in the trace and the finish time of the last record in the trace. Thus, for the trace 300A of FIG. 3A, the length t1 is the time elapsed between the start S1 of request Req.1 and the finish F3 of request Req.3. In one aspect, the amount of time that the trace records are collected is selected prior to collecting the trace records. For example, it may be desired to collect trace records for a time period of, for example, one hour. It will be apparent however that another time period may be selected, such as a number of seconds, minutes, hours, days, and so forth. After selecting the time period, the records are collected for the selected time period (step 204). If a request is outstanding (started, but not finished) at the end of the period, then the request may be excluded from, or included in, the trace. The length of the trace may then be computed as before, based on the requests in the trace, or may be computed as the selected interval for collection.

Then, in a step 210, a first time-based statistic, corresponding to the collected trace, may be compared to a second time-based statistic, corresponding to the replay trace (e.g., by forming a ratio). This may be accomplished by computing a ratio of the length of replay trace and the length of the collected trace. This ratio is indicative of the utilization of the resource.

Alternately, rather than comparing the time during which the trace is collected to the time required to run the time-altered trace, a comparison may be made of a sum of request durations of the trace during collection to a sum of request duration when the time-altered trace is run. More particularly, in the step 210 rather than determine the length of the entire collected trace, the duration of each request may be determined and summed:

$$\text{Sum of Durations(during collection)} = \Sigma(F_1^{collection} - S_1^{collection}) \quad (5)$$

Then, rather than determine the entire time required to run the time-altered trace, the duration of each request may be determined and summed:

$$\text{Sum of Durations(during replay)} = (F_1^{time\_altered} - S_1^{time\_altered}) \quad (6)$$

A ratio of these sums may then be computed, for example:

$$\text{Ratio} = \frac{\sum (F_i^{time\_altered} - S_i^{time\_altered})}{\sum (F_i^{collection} - S_i^{collection})} \quad (7)$$

where this ratio indicates utilization of the resource. Alternately, for each request, a ratio of the replay duration to the original duration of the trace may be computed. Then, these ratios may be summed and a mean computed as follows:

$$\text{Ration} = \frac{\sum \left( \frac{F_i^{time\_altered} - S_i^{time\_altered}}{F_i^{collection} - S_i^{collection}} \right)}{n} \quad (8)$$

where n is the number of requests in the trace.

From the step 210, program flow may terminate in a step 212. It will be apparent that the steps of FIG. 2 need not all be performed in the order shown. For example, determining the time-based statistic for the collected trace may be performed prior to running the trace (step 206), rather than during step 210.

In another aspect of the invention, the time-altered trace may be run (in step 206) on a system that is substantially different from a system from which the trace was collected (in step 204). As before, the trace may be run on the second computing system while a time basis of requests of the trace is altered. The time-based statistic (e.g., the total length of the collected trace or the sum of request durations) for running the trace on the second computing system may then be determined.

Comparing the time-based statistic for running time-altered trace on the first system to the time-based statistic for running the time-altered trace on the second system, is thus indicative of the relative capabilities of the first and second computing systems. Also, comparing the time-based statistic determined for collecting the trace from the first system to the time-based statistic for running the time-altered trace on the second system may indicate utilization of the second system.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of determining utilization of a computing system resource, comprising:
   collecting a trace of requests in a computing system;
   running the trace while altering a time-basis of the requests of the trace by issuing each request at a time that is based on timing of one or more prior requests; and
   comparing a first time-based statistic associated with said collecting the trace to a second time-based statistic associated with said running the trace to determine the utilization, wherein the first time-based statistic comprises a period of time over which the trace of requests extends and wherein the second time-based statistic comprises a time required to complete said running the trace.

2. The method according to claim 1, wherein said comparing comprises forming a ratio of the first time-based statistic and the second time-based statistic.

3. The method according to claim 1, further comprising computing a queue length statistic for the trace and wherein said altering the time basis comprises maintaining the queue length statistic.

4. The method according to claim 3, wherein the queue length statistic comprises an average queue length.

5. The method according to claim 4, wherein said average queue length is computed as a sum of the length of time that each request in the trace is pending divided by the duration of the trace.

6. The method according to claim 4, wherein said average queue length is computed as a sum over all of the requests of the number of requests outstanding at a time corresponding to each request, divided by a total number of requests.

7. The method according to claim 6, wherein the time corresponding to a request is a start time of the request.

8. The method according to claim 3, wherein said maintaining the queue length statistic comprises maintaining a moving average of queue length for the trace during running the trace equal to the average queue length.

9. The method according to claim 3, further comprising dividing the trace into a plurality of intervals and computing the queue length statistic for each of the plurality of intervals, wherein said altering the time basis comprises maintaining the queue length statistic for each of the plurality of intervals.

10. The method according to claim 9, wherein the queue length statistic for each of the plurality of intervals is an average of the queue length during the interval.

11. The method according to claim 10, wherein a request is pending during multiple intervals and wherein the queue length statistic for each of the intervals is computed based on the time that the request is pending in the corresponding interval.

12. The method according to claim 9, wherein said running the trace further comprises starting a next interval prior to completion of a current interval.

13. The method according to claim 3, wherein computing the queue length statistic comprises determining a queue length associated with each request, thereby forming a series of queue length values, one queue length value for each request, and wherein said running the trace comprises initiating each request so that the corresponding queue length value is maintained.

14. The method according to claim 13, wherein the queue length associated with a request is determined as of a start time for the request.

15. The method according to claim 3, further comprising:
running the trace on a second computing system by issuing and executing the requests of the trace while maintaining the queue length statistic and altering a time basis of requests of the trace, wherein a third time period is required to complete said running the trace on the second computing system.

16. The method according to claim 15, further comprising comparing the third time-based statistic to the second time-based statistic wherein said comparing the third time-based statistic to the second time-based statistic indicates a comparison of capabilities of the first and second computing systems.

17. The method according to claim 1, wherein said computing system comprises a data storage system.

18. The method according to claim 1, wherein said collecting comprises collecting only traces for one or more selected components of the computing system.

19. The method according to claim 1, wherein running the trace is performed on different computing system.

20. The method according to claim 1, wherein running the trace is performed on the same or a similar computing system.

21. The method according to claim 1, wherein altering the time-basis results in time-compressing the trace.

22. The method according to claim 1, wherein altering the time-basis results in time-expanding the trace.

23. A method of determining utilization of a computing system resource, comprising:
collecting a trace of requests in a computing system;
running the trace while altering a time-basis of the requests of the trace by issuing each request at a time that is based on timing of one or more prior requests; and
comparing a first time-based statistic associated with said collecting the trace to a second time-based statistic associated with said running the trace to determine the utilization, wherein the first time-based statistic is determined by computing a sum of request durations for collecting the trace and wherein the second time-based statistic is determined by computing a sum of request durations for said running the trace.

24. The method according to claim 23, wherein said comparing comprises forming a ratio of the first time-based statistic and the second time-based statistic.

25. A method of determining utilization of a computing system resource, comprising:
collecting a trace of requests in a computing system;
running the trace while altering a time-basis of the requests of the trace by issuing each request at a time that is based on timing of one or more prior requests; and
comparing a first time-based statistic associated with said collecting the trace to a second time-based statistic associated with said running the trace to determine the utilization, wherein the first time-based statistic is determined by computing a duration for each request for collecting the trace and wherein the second time-based statistic is determined by computing a duration for each request for said running the trace and said comparing comprises computing a plurality of ratios of the first time-based statistic and the second time-based statistic for each request and computing a mean of the plurality of ratios.

26. A method of determining utilization of a computing system resource, comprising:
collecting and storing a trace of requests in a computing system, the trace including at least a start time for each request represented in the trace;
identifying intervals of a first type within the trace, each interval of the first type having a beginning that coincides with a start time of a first request for the interval and an ending that coincides with a start time of a second request for the interval, wherein the start time of the second request occurs later than the start time of the first request;
running the trace by issuing and executing the requests of the trace while altering a time-basis of the requests of the trace by altering the intervals of the first type; and
comparing a first time-based statistic associated with said collecting the trace to a second time-based statistic associated with said running the trace to determine the utilization.

27. The method according to claim 26, wherein intervals are identified only for selected requests of the trace.

28. The method according to claim 27, the selected requests of the trace relate to a selected application of the computing system.

29. The method according to claim 26, wherein said altering a time-basis of the requests of the trace comprises reducing said intervals of the first type to zero.

30. The method according to claim 26, wherein said altering a time-basis of the requests of the trace comprises reducing said intervals of the first type by a predetermined proportion.

31. The method according to claim 26, further comprising:
identifying intervals of a second type within the trace, each interval of the second type having a beginning that coincides with a finish time of a first request for the interval and an ending that coincides with a start time of a second request for the interval, wherein the start time of the second request occurs later than the start time of the first request.

32. The method according to claim 31, wherein said altering a time-basis of the requests of the trace comprises reducing said intervals of the second type to zero.

33. The method according to claim 31, wherein said altering a time-basis of the requests of the trace comprises reducing said intervals of the second type by a predetermined proportion.

* * * * *

UNITED STATES PATENT AND TRADEMARK OFFICE
CERTIFICATE OF CORRECTION

PATENT NO. : 7,284,052 B1
APPLICATION NO. : 10/210939
DATED : October 16, 2007
INVENTOR(S) : Eric Anderson It is certified that error appears in the above-identified patent and that said Letters Patent is hereby corrected as shown below:

In column 4, lines 61-63, in equation 2, delete "(F3-S2)" and insert -- (F3-S3) --, therefor.

In column 9, lines 40-41, in equation 5, delete "$(F_1^{collection} - S_1^{collection})$" and insert -- $(F_i^{collection} - S_i^{collection})$ --, therefor.

In column 9, lines 46-47, in equation 6, delete "$(F_1^{time\_altered} - S_1^{time\_altered})$" and insert -- $\Sigma(F_i^{time\_altered} - S_i^{time\_altered})$ --, therefor.

In column 9, line 64, in equation 8, delete "Ration" and insert -- Ratio --, therefor.

In column 12, line 52, in Claim 28, after "27," insert -- wherein --.

Signed and Sealed this

Twenty-second Day of July, 2008

JON W. DUDAS
*Director of the United States Patent and Trademark Office*